Figure 1:
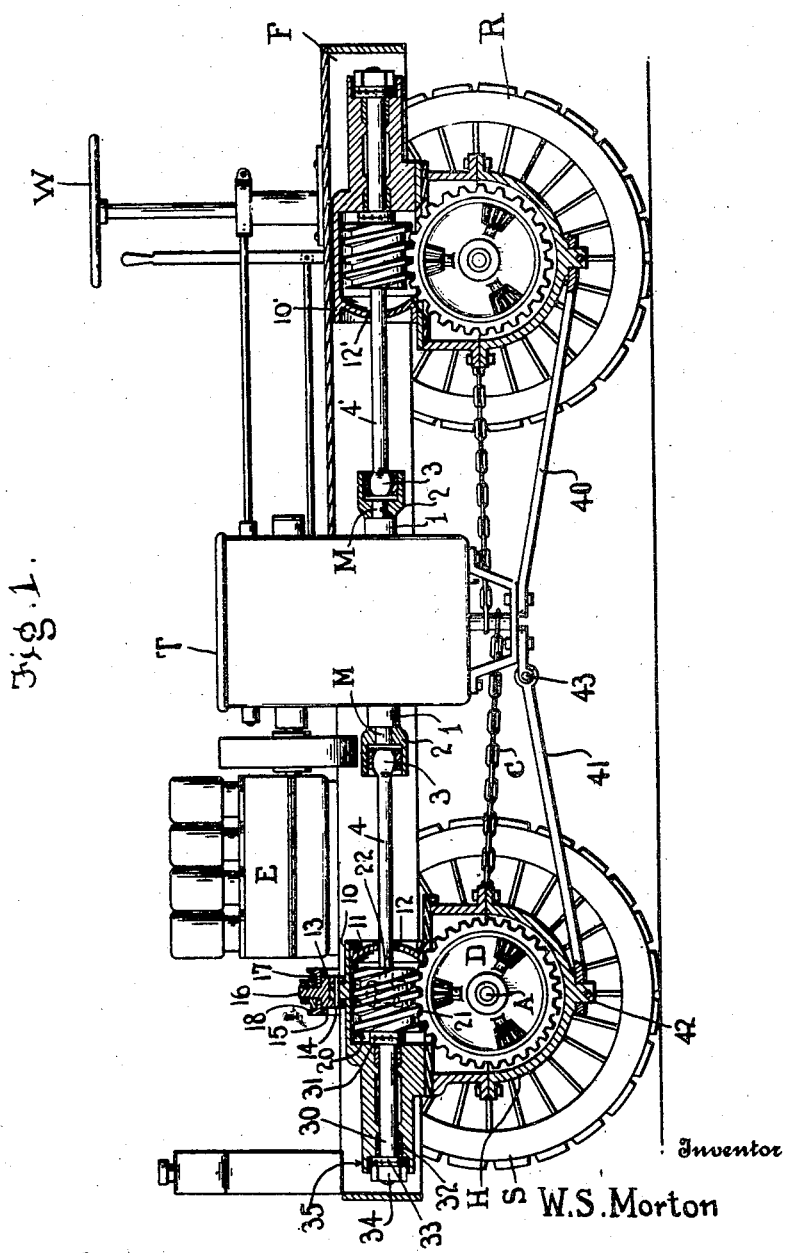

W. S. MORTON.
WORM DRIVE FOR MOTOR VEHICLES.
APPLICATION FILED OCT. 8, 1912.

1,076,052.

Patented Oct. 21, 1913.
3 SHEETS—SHEET 1.

Witnesses
L. B. James
N. L. Collamer

Inventor
W. S. Morton
By H. R. Williamson & Co.
Attorneys

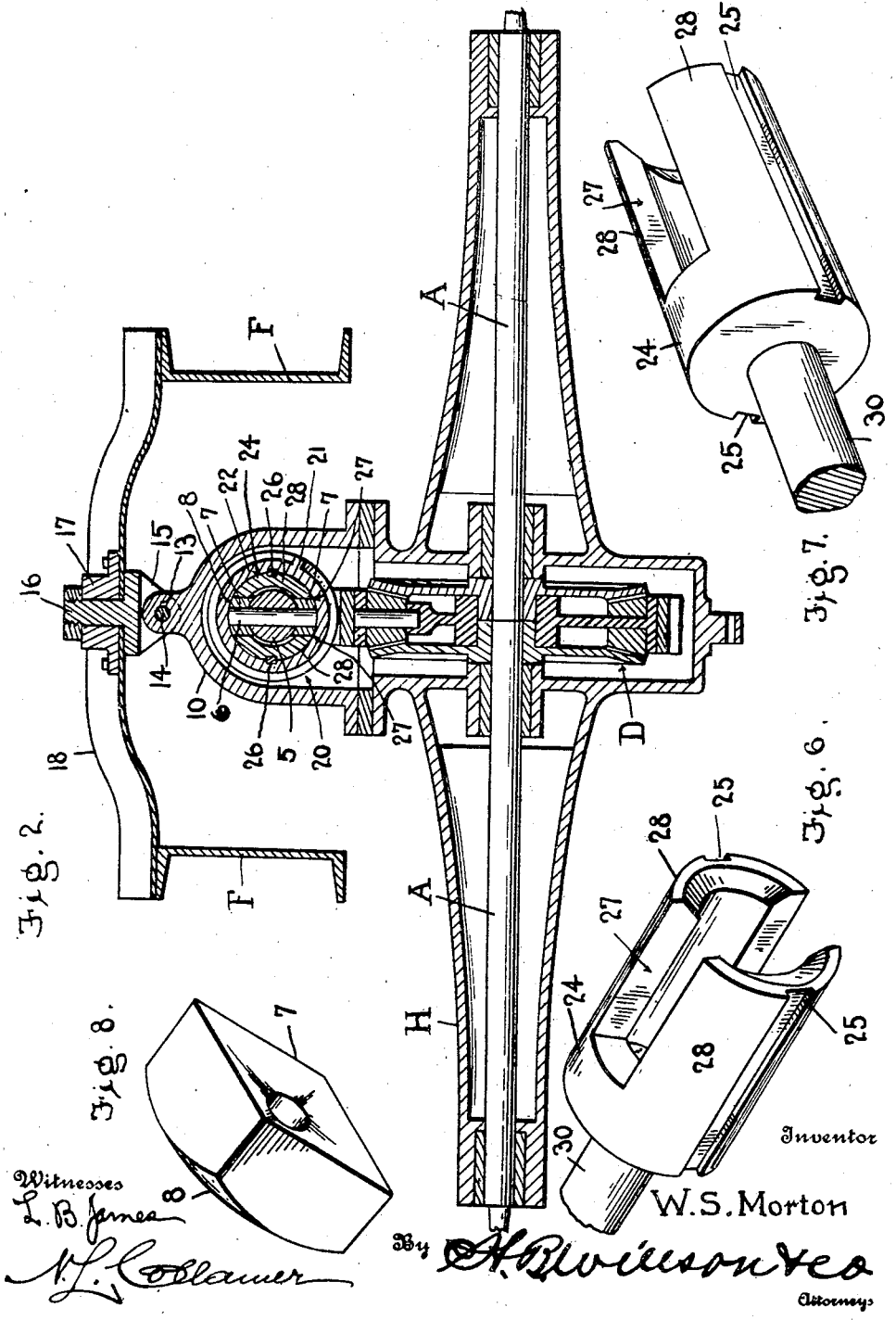

W. S. MORTON.
WORM DRIVE FOR MOTOR VEHICLES.
APPLICATION FILED OCT. 8, 1912.
1,076,052.
Patented Oct. 21, 1913.
3 SHEETS—SHEET 3.
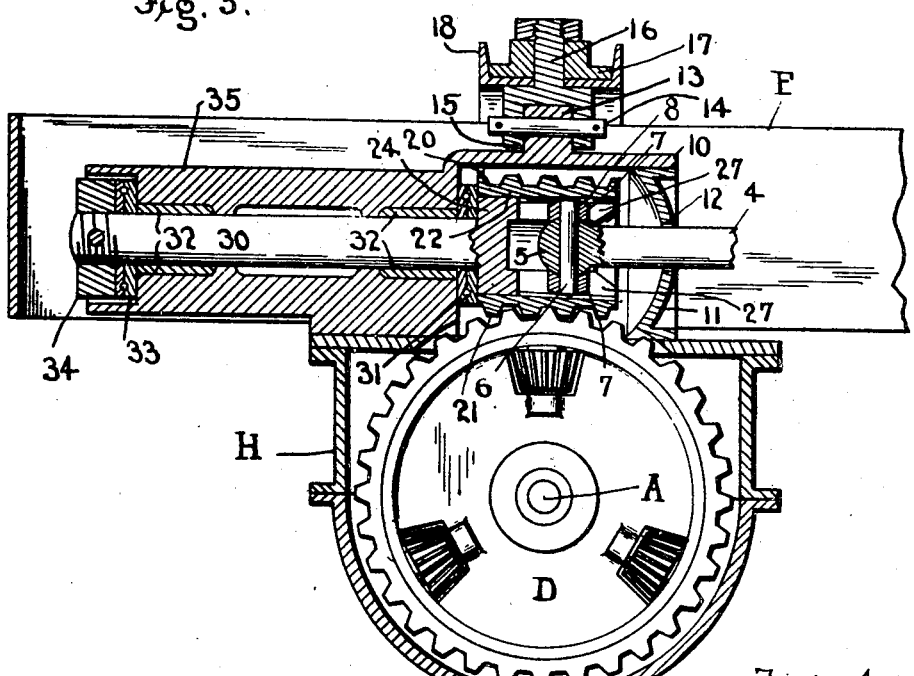
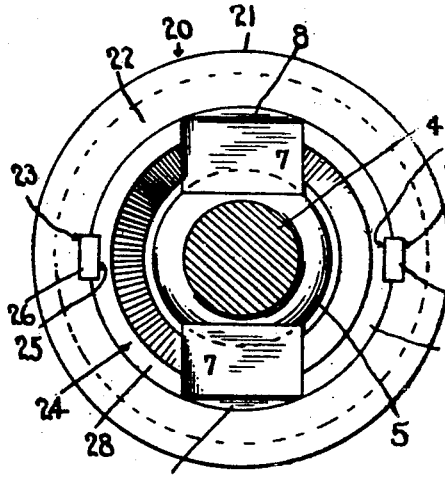
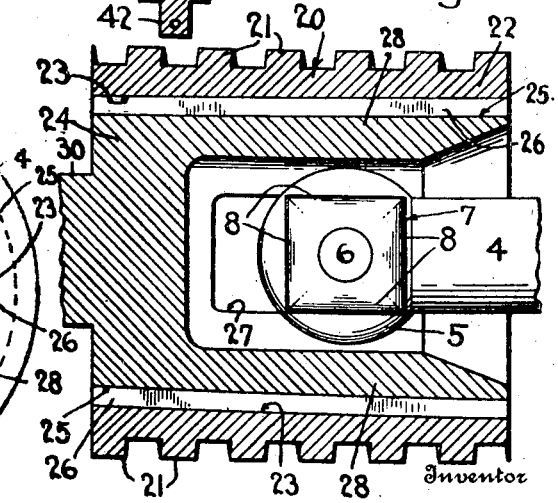
Witnesses
L. B. James
N. L. Collamer
Inventor
W. S. Morton
By A. B. Wilson & Co.
Attorneys

UNITED STATES PATENT OFFICE.

WALTER S. MORTON, OF HARRISBURG, PENNSYLVANIA.

WORM-DRIVE FOR MOTOR-VEHICLES.

1,076,052.   Specification of Letters Patent.   Patented Oct. 21, 1913.

Application filed October 8, 1912. Serial No. 724,670. REISSUED

*To all whom it may concern:*

Be it known that I, WALTER S. MORTON, a citizen of the United States, residing at Harrisburg, in the county of Dauphin and State of Pennsylvania, have invented certain new and useful Improvements in Worm-Drives for Motor-Vehicles; and I do declare the following to be a full, clear, and exact description of the invention, such as will enable others skilled in the art to which it appertains to make and use the same.

This invention relates to motor vehicles, and more especially to the driving mechanism therefor; and the object of the same is to produce improved means for driving both axles by worms on the driving shaft, which latter is made in section connected by peculiar forms of universal joints so that the necessary movements of the axles beneath the framework is permitted. This and other objects are carried out by constructing my invention in the manner hereinafter more fully described and claimed, and as shown in the drawings wherein—

Figure 1 is a central longitudinal sectional view through a motor vehicle possessing this improved worm drive. Fig. 2 is an enlarged cross section through the steering axle thereof. Fig. 3 is an enlarged longitudinal section through the center of the driving mechanism for said steering axle, and through its differential. Fig. 4 is a still further enlarged horizontal section through the universal joint of said driving mechanism, and Fig. 5 is an end view thereof taken from the right of Fig. 4. Figs. 6 and 7 are perspective views of the so called "plug," taken from different angles, and Fig. 8 is a perspective detail of the so called "block."

In the drawings is shown a motor vehicle or truck comprising the front or steering wheels S, the rear wheels R, all mounted on axles A inclosed within housings H and employing any well known form of differentials D, and F is the framework on which is supported an engine E whose shaft is connected through suitable transmission mechanism T with the main or driving shaft M. In the present illustration the truck is steered by means connecting the steering wheel W at the rear of the frame F with the front axle which carries the front wheels S, and said connections are shown as including chains C. The purpose of the present invention is to employ a worm drive mechanism connecting the main shaft M with both axles, and designed so as to permit the rocking motion of the front axle as one of its wheels S passes over an obstruction, as well as the oscillation thereof as this axle is turned around the king bolt by the steering mechanism.

Coming now more particularly to the details of the present invention, the numeral 1 designates bearings in the front and rear sides of the housing for the transmission T, through which bearings project the extremities of the main shaft M which—as usual with machines of this character—is connected with the engine shaft through mechanism for imparting a proper speed to the main shaft and through a clutch for starting and stopping the rotation thereof at will. In the present case it is my purpose to connect both extremities of the main shaft M to the axles, and, in so far as the connections in front and in rear of the transmissions are duplicates of each other, a description of one will suffice for both.

The numeral 2 designates the cupped or female member of a universal joint attached to the extremity of the main shaft M, and the numeral 3 the male member thereof which is connected with one extremity of a shaft section 4 leading forward (or backward) from the transmission T to a point over the axle A. Here the opposite extremity of the shaft section 4 carries a ball 5 through which extends a transverse pin or bolt 6, and on each end of said pin is mounted a block 7 which is preferably square in cross section as shown in Fig. 8 but whose inner end is dished to fit around the ball and whose outer end 8 is rounded as shown, so that in effect the block is concavo-convex. In the illustration herewith the same universal joint 2—3 is employed at the rear end of the main shaft M. and the rear-shaft section 4' leads through a hole 12' in a casing 10' to and is connected directly with a worm which engages a gear around the differential mechanism D of the rear axle; but as this worm is supported in substantially the same manner as that over the front axle yet to be described, and needs no universal joint within it since the rear axle is not pivoted on a king bolt, further description of the rear portion of the machine will not be necessary.

The numeral 10 designates a tubular casing loosely inclosing the front end of the front shaft section 4 and having its rear end removably closed by a dust guard 11 pierced with a lateral slot 12 through which said shaft section moves, the casing 10 being suitably mounted upon the housing H for the front axle and open at its bottom so that the worm and worm gear may mesh as described below. The upper side of the casing 10 carries a lug or knuckle 13 which is mounted on a horizontal pivot pin 14 between the arms of a fork 15 at the lower end of a king bolt 16, which latter stands upright and is suitably mounted within a bearing 17 supported at the center of an arched yoke 18 connecting the side bars of the frame F as best seen in Fig. 2. The fork-arms constitute knuckles between which stands the lug or knuckle 13, and the pivot pin 14 connecting them permits the rocking of the axle A as one of its wheels passes over an obstruction; whereas the function of the king bolt is, as usual, to permit the oscillation of the front axle as it is turned by the steering mechanism hereinbefore referred to. With either movement, or with the combined movements of the axle and its housing H, the casing 10 and its contained mechanism participate, and therefore the connection between the front end of the shaft section 4 and the gear surrounding the differential D must be such as to permit these movements of the casing 10.

The worm gear 20 surrounding the differential D may be of any suitable character, but the worm 21 meshing therewith is formed of threads surrounding a tubular shell 22 whose bore flares slightly toward the inner end and is provided internally with two longitudinal key ways 23; and within this shell is closely fitted a plug 24 externally provided with key ways 25 adapted to register with those numbered 23 so that keys 26 may be driven therein, the inner end of the plug flaring slightly to fit the bore of the shell and being forked or bifurcated on a line at right angles to the key ways so as to produce an upright slot 27 in which the blocks 7 work freely but wherein they are confined between the fork arms 28.

The entire worm is carried by the rear end of a shaft 30 which is preferably formed integral with the axis of the plug 24, said shaft—or more properly "spindle"—projecting thence forward along the center of the framework F, through a thrust bearing 31, then through one or more ordinary roller or ball bearings 32, then through another thrust bearing 33 and finally receiving a nut 34 on its forward extremity. These various bearings are mounted within a tubular extension 35 which may be attached to or form an integral part of the casing 10 that incloses the worm and is mounted on the axle housing H, and when the latter turns or rocks it is obvious that the casing will move with it and also the tubular extension 35 as there is ample room for it to play between the side bars of the frame F. Thus is produced a long bearing for the spindle 30 upon which of course a great deal of strain is thrown as the shaft section 4 is turned by power to drive the vehicle in either direction. Longitudinal movement of said spindle in either direction is resisted by the thrust bearings, forward movement of the worm is resisted by the rearmost thrust bearing 31, and rearward movement of the worm is resisted by the fact that its interior tapers toward the front and fits closely around the exterior of the fork arms 28 and plug 24 which also taper in the same direction, whereas the keys 26 hold these parts against relative rotation.

With respect to the rear axle, the drawings herewith show the same spindle and its bearings, and the same worm engaging a worm gear; but if the rear axle is not mounted on a king bolt there is no necessity for a universal joint on the inside of the worm and the latter may therefore be mounted on the rear extremity of the rear shaft section 4' in any suitable manner so as to cause it to rotate therewith. In such event the brace 40 connecting the rear housing H with some part of the framework need not be pivoted as is the front brace 41 at the points 42 and 43.

When the vehicle passes over an obstruction which for instance will ordinarily lift first one front wheel and then the rear wheel directly behind it, the front axle will cant or tilt on its pivot 14, and in such movement it will carry with it the entire casing 10 and its extension 35 and all parts within the same, the two universal joints between the transmission mechanism and worm over the front axle permitting the canting of the latter as described. As the front wheel passes over the obstruction the axle resumes its horizontal position, and meanwhile the frame F of the machine has not been put under strain. When now the rear wheel strikes the same obstruction, the rise of one end of the rear axle will cause the frame to rise with it, but as the front axle by this time is traveling on level ground the same pivot 14 permits the canting of the entire framework. When the front axle is turned aside on its king bolt by the steering mechanism, the entire casing 10 and its extension 35 and all that they contain turn with such axle as the forward universal joint will permit, and yet there is no interruption to the transmission of power from the engine to said axle, whatever the position of the latter.

As first above stated, the drawings herewith illustrate the rear axle as fixed; but it will be clear from the description above that the mechanism herein shown for the front axle could be duplicated over the rear axle by the simple addition of short-turning mechanism to cause the rear axle to turn in an opposite direction to the front axle when the device is to be steered. I do not, therefore, wish to be confined to the use of my invention in connection with one axle only; and the details of construction, as well as the proportions and materials of parts are not essential to the present invention.

What is claimed as new is:

1. In a worm drive for motor vehicles, the combination with the vehicle frame, the axle and its housing, a casing mounted on the latter, a king bolt in the frame, a pivot between the king bolt and casing, and a worm gear carried by the axle; of a hollow worm journaled within said housing and engaging said worm gear, the bore of the worm having longitudinal slots, a shaft section connected with the motor, and a ball on the extremity of said section standing beneath said king bolt and having blocks engaging said slots, for the purpose set forth.

2. In a worm drive for motor vehicles, the combination with the vehicle frame, the axle and its housing, a casing mounted on the latter, a king bolt in the frame, a pivot between the king bolt and casing, and a gear carried by the axle; of a tubular extension projecting from said casing, a spindle journaled therein and forked at its inner end, a hollow worm disposed within said casing and secured around the forked end of the spindle so that the fork-arms produce an internal slot, a horizontally slotted dust guard at the inner end of said casing, a shaft section connected with the motor and projecting through the slot in said dust guard, and blocks carried by its front end and engaging said slots within the worm at a point above the axle, for the purpose set forth.

3. In a worm drive for motor vehicles, the combination with the vehicle frame, the axle and its housing, a casing mounted on the latter, a king bolt in the frame, a pivot between the king bolt and casing, and a worm gear carried by the axle; of a bearing carried by said casing, a spindle journaled in such bearing and having a forked plug at its inner end, a hollow worm engaging said worm gear and keyed around the arms of said fork, a shaft section connected at its inner end with the motor, and blocks at its front end standing over said axle and engaging the slot between the fork-arms, for the purpose set forth.

4. In a worm drive for motor vehicles, the combination with the vehicle frame, the axle and its housing, a casing mounted on the latter, a king bolt in the frame, a pivot between the king bolt and casing, and a worm gear carried by the axle; of a bearing carried by said casing, a spindle journaled therein and carrying at its inner end a plug externally flaring inward and transversely slotted to produce fork arms, said arms having key ways at right angles to the slot between them, a tubular worm standing within said casing and engaging the worm gear, its interior being flaring to fit upon said plug and its fork-arms and having key ways adapted to register with those therein, keys in the ways, a shaft section connected at its inner end with the motor, a ball at the outer end thereof standing within said worm and normally over said axle, a pin extending transversely through the ball, and blocks on the extremities of said pin sliding in the slot between the fork-arms, for the purpose set forth.

5. In a worm gear mechanism, the combination with the driven element, a worm gear thereon, a housing for said element and gear having an opening through which the latter projects, a casing secured upon the housing, and flexible connections between said casing and the framework of the machine; of a bearing carried by said casing, a spindle journaled therein and carrying at its inner end a plug externally flaring inward and transversely slotted to produce fork arms, said arms having key ways at right angles to the slot between them, a tubular worm standing within said casing and engaging the worm gear, its interior being flaring to fit upon said plug and its fork-arms and having key ways adapted to register with those therein, keys in the ways, a shaft section connected at its inner end with the motor, a ball at the outer end thereof standing within said worm and normally over said axle, a pin extending transversely through the ball, and blocks on the extremities of said pin sliding in the slot between the fork-arms, for the purpose set forth.

In testimony whereof I have hereunto set my hand in presence of two subscribing witnesses.

WALTER S. MORTON.

Witnesses:
G. E. WANTZ,
M. E. TROSTLE.